United States Patent
Weber et al.

(10) Patent No.: US 11,729,188 B2
(45) Date of Patent: *Aug. 15, 2023

(54) METHOD AND DEVICE FOR INTRUSION DETECTION IN A COMPUTER NETWORK

(71) Applicant: Robert Bosch GmbH, Stuttgart (DE)

(72) Inventors: Andreas Weber, Weissach (DE); Janin Wolfinger, Birkenfeld (DE); Jens Gramm, Tuebingen (DE); Michael Herrmann, Düsseldorf (DE); Wolfram Gottschlich, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 458 days.

This patent is subject to a terminal disclaimer.

(21) Appl. No.: 16/922,329

(22) Filed: Jul. 7, 2020

(65) Prior Publication Data

US 2021/0014248 A1 Jan. 14, 2021

(30) Foreign Application Priority Data

Jul. 10, 2019 (DE) .................. 102019210230.1

(51) Int. Cl.
    *G06F 21/00* (2013.01)
    *H04L 9/40* (2022.01)
    *H04L 12/46* (2006.01)
    *H04L 61/5014* (2022.01)

(52) U.S. Cl.
    CPC ...... *H04L 63/1416* (2013.01); *H04L 12/4641* (2013.01); *H04L 61/5014* (2022.05); *H04L 63/1425* (2013.01); *H04L 63/1466* (2013.01); *H04L 63/162* (2013.01)

(58) Field of Classification Search
    CPC ............. H04L 63/1416; H04L 12/4641; H04L 61/5014; H04L 63/1425; H04L 63/1466; H04L 63/162; H04L 63/0227; H04L 63/0254; H04L 63/1408; H04L 67/12
    See application file for complete search history.

(56) References Cited

U.S. PATENT DOCUMENTS

| | | | |
|---|---|---|---|
| 10,701,002 B1* | 6/2020 | Schroder | H04L 47/2441 |
| 2008/0071779 A1* | 3/2008 | Mammen | G06F 16/24568 |
| 2008/0201772 A1* | 8/2008 | Mondaeev | H04L 47/12 726/13 |
| 2012/0218901 A1* | 8/2012 | Jungck | H04L 63/0263 370/241 |
| 2019/0059055 A1* | 2/2019 | Murali | H04W 52/0229 |
| 2020/0159723 A1* | 5/2020 | Goyal | G06F 3/0484 |

* cited by examiner

*Primary Examiner* — Kendall Dolly
(74) *Attorney, Agent, or Firm* — Norton Rose Fulbright US LLP; Gerard Messina (57) ABSTRACT

Device and method for intrusion detection in a computer network. A data packet is received at an input of a hardware switch unit, an actual value from a field of the data packet being compared in a comparison by a hardware filter with a setpoint value for values from the field, the field including data link layer data or network layer data, a value for a counter determined as a function of a result of the comparison being provided by the hardware switch unit, and a computing device determining a result of the intrusion detection as a function of the value of the counter in the hardware switch unit and independently of information from the data packet, in particular, without an evaluation of information from the data packet by the computing device.

17 Claims, 3 Drawing Sheets

METHOD AND DEVICE FOR INTRUSION DETECTION IN A COMPUTER NETWORK

CROSS REFERENCE

The present application claims the benefit under 35 U.S.C. § 119 of German Patent Application No. DE 102019210230.1 filed on Jul. 10, 2019, which is expressly incorporated herein by reference in its entirety.

FIELD

The present invention is directed to a method and to a device for intrusion detection in a computer network.

BACKGROUND INFORMATION

The task of such a "Network Intrusion Detection and Prevention System" (NIDPS) is to identify and to respond to anomalies in the network traffic of a distributed computer system. NIDPS are systems that are typically used to detect and to prevent intrusions in corporate networks, so-called enterprise networks. NIDPS may also be used in automotive networks. Automotive networks are internal networks of vehicles that include "Electronic Control Units" (ECUs) as network nodes.

Due to functional differences between enterprise networks and automotive networks, NIDPS for enterprise networks are unable to be efficiently used for automotive networks.

It is therefore desirable to provide an NIDPS for an automotive network.

SUMMARY

This may be achieved in accordance with example embodiments of the present invention.

In order to provide an NIDPS for an automotive network, differences between automotive networks and enterprise networks should be taken into account. These differences are, for example, their network structure, network dynamics and the network nodes.

Network structure:

An enterprise network typically follows a client-server model, in which there is a smaller number of dedicated server-network nodes, which offer services to a typically higher number of client-network nodes. Automotive networks are made up of ECUs, on which both server applications and client applications are carried out.

Enterprise networks are, in general, significantly larger and more complex than automotive networks. The totality of an enterprise network is typically significantly more segmented, physically or logically separated into different zones and sub-networks. ECUs in typical automotive networks are, if at all, separated by "gateways" into only very few sub-networks or logically separated at the Ethernet level via so-called "Virtual Local Area Networks" (VLANs).

Network dynamics:

Enterprise networks and automotive networks differ in terms of their dynamics with which the network is changed and operated.

In enterprise networks, network nodes may be arbitrarily interchanged. For changes in server-network nodes, an adaptation in the configuration of the security systems such as, for example, the NIDPS, may typically also be carried out. In contrast, such adaptations in network nodes, which are clients, are not possible. This is due to the fact that clients are connected to the network from alternating locations and are frequently interchanged. It is also not possible to precisely predict which applications are executed on a client.

ECUs in automotive networks are interchanged very rarely, if at all, and are then frequently also replaced only by an identical copy. It is therefore unlikely that anything changes in the functionality of the network. In an automotive network, the network nodes are known without exception. The respectively running server and client applications on the network are also well defined and details about the network communication may be predefined.

In enterprise networks, nodes may establish connections into an enterprise network from the outside. In an automotive network, all communication nodes of the network are part of the internal vehicle network.

In enterprise networks, different users may typically use the same client. In ECUs of automotive networks, there are no users, but merely server and client applications, which perform their service.

Network nodes:

With regard to resources, the network nodes of an enterprise network are, in general, multiple times more resource-intensive—for example with respect to memory and performance—than ECUs of an automotive network.

With regard to the software, the network nodes in enterprise networks are usually equipped with widely common standard operating systems and standard software, for which security weaknesses are known. For this reason, a key focus of NIDPS systems in enterprise networks is to detect in a signature-based manner when the attempt is being made to exploit known security weaknesses. The network nodes in automotive networks are generally equipped with less common software. A majority of the signatures from NIDPS systems for enterprise networks is not usable, and there are no larger databases relating to weaknesses known specifically for automotive networks.

The fundamental task of an NIDPS, i.e., detecting and responding to anomalies in the network traffic, is the same in enterprise networks and automotive networks. However, it is apparent from the aforementioned points that the basic functionality of an efficient NIDPS for automotive networks should differ fundamentally from that of an NIDPS for enterprise networks. An NIDPS for an automotive network must take advantage of the known and static network structure as well as of the significantly lower dynamics of the network users, in order to be able to efficiently detect anomalies with limited resources.

In accordance with an example embodiment of the present invention, a method particularly advantageous in this regard provides that a data packet is received at an input of a hardware switch unit, an actual value from a field of the data packet being compared in a comparison by a hardware filter with a setpoint value for values from this field, the field including data link layer data or network layer data, a value for a counter determined as a function of a result of the comparison being provided by the hardware switch and a computing device determining a result of the intrusion detection as a function of the value of the counter in the hardware switch and independently of information from the data packet, in particular, without an evaluation of information from the data packet by the computing device. As a result, an NIDS is implemented, in which a switch CPU is accessed only on the counter without analyzing the entire network traffic on the switch CPU. The switch hardware analyzes each data packet of the network at least to OSI layer 2 and in some systems in part also to OSI layer 3 in order to implement the switching. If anomalies in a data packet are established in this analysis, the data packet is not forwarded to the switch CPU, rather the counter is incremented. The switch CPU does not analyze the data packet but only the counter and implements a stateless or stateful NIDS based on the analysis results. This two-stage NIDS is very resource-efficient and is particularly suited for automotive networks.

The value of the counter is preferably incremented when a deviation between the actual value and the setpoint value is present, in particular, reaches, exceeds, or falls below a threshold value.

The counter is preferably a hardware counter in a register of the hardware switch unit.

It is preferably provided that the hardware filter includes a Ternary Content Addressable Memory, in which a mask for the setpoint value is stored, the actual value being compared in the comparison with the mask stored in the Ternary Content Addressable Memory. This makes it possible to check freely-configurable properties of the data packets in the first stage of the NIDS.

The setpoint value preferably characterizes a hardware address from the memory, in particular, a Medium Access Control address, the actual value being determined as a function of data from a hardware address field, in particular, a Medium Access Control address of a data packet at the input or output. In this way, it is possible to evaluate an irregularity with respect to the Medium Access Control address in the first stage of the NIDS.

The setpoint value preferably characterizes a Virtual Local Area Network, the setpoint value being determined from the memory, the actual value being determined as a function of data, which characterize the association of a data packet at the input or output with a Virtual Local Area Network. In this way, it is possible to evaluate an irregularity with respect to the association with a Virtual Local Area Network in the first stage of the NIDS.

Preferably, the presence of a deviation is detected in the result, either when the hardware filter at the input or output for a tagged Virtual Logical Area Network establishes an untagged Virtual Logical Area Network data packet, or when the hardware filter at the input or output for an untagged Virtual Logical Area Network establishes a tagged Virtual Logical Area Network data packet This makes it possible to detect further irregularities with respect to the Virtual Logical Area Network in the first stage of the NIDS.

Preferably, the presence of a deviation is detected in the result when the hardware filter at the input or output establishes a data packet having an unknown Ethertype, including a false checksum, a false packet length or a false packet structure. This makes it possible to detect further irregularities in the structure or content of the data packet in the first stage of the NIDS.

Preferably, the presence of a deviation is detected in the result when a Dynamic Host Configuration Protocol filter at the input or output establishes a Dynamic Host Configuration Protocol packet for Internet Protocol Version 4 and/or for Internet Protocol Version 6 including Dynamic Host Configuration Protocol port 67 and/or port 68, a User Datagram Protocol filter at the input or output establishes a User Datagram Protocol Broadcast message for Internet Protocol Version 4 and/or for Internet Protocol Version 6, a Precision Time Protocol filter at the input or output establishes a Precision Time Protocol message, the content of which, in particular, time stamp, sequence number, correction field, is stored at least temporarily in a register for context information. This makes it possible to detect a protocol-specific irregularity with respect to the data packet in the first stage of the NIDS.

It is preferably provided that in addition, a content of the Ethernet data packet is also analyzed, in particular, if a need therefore is detected based on the value for the counter.

In accordance with an example embodiment of the present invention, a device for intrusion detection in a computer network is designed as a system on a chip system, which includes a hardware switch unit, a hardware filter and a microprocessor for the intrusion detection, and is designed to carry out the method. This approach is particularly well suited for automotive networks.

The device preferably includes a counting unit, which is designed to increment the value of the counter when a deviation between the actual value and the setpoint value is present or exceeds a threshold value.

The counter is preferably a hardware counter in a register of the device.

A Ternary Content Addressable Memory, an Address Translation Unit, a Virtual Local Area Network Unit, a Dynamic Host Configuration Protocol filter, a User Datagram Protocol filter and/or a Precision Time Protocol filter is/are preferably designed as a hardware filter to analyze a data packet for the intrusion detection and to determine the result for the determination of the value of the counter. In this way, it is possible to particularly efficiently carry out aspects of the method in the switch hardware.

Additional advantageous specific embodiments result from the description below and from the figures.

DETAILED DESCRIPTION OF EXAMPLE EMBODIMENTS

Figure 1:
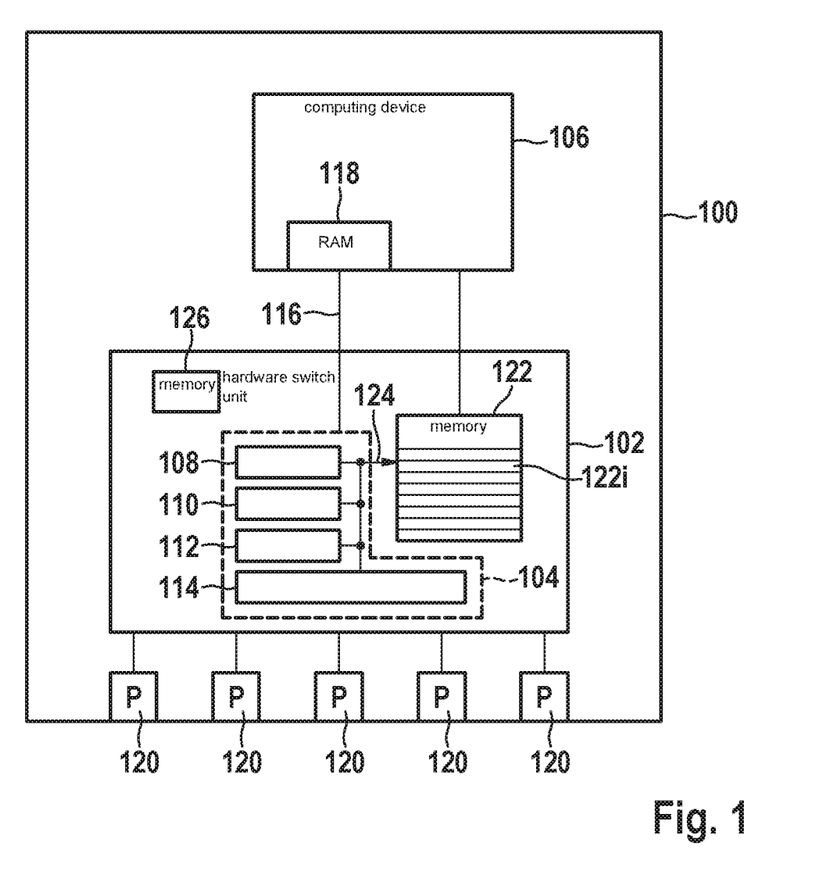
FIG. 1 schematically shows a representation of a device for intrusion detection in accordance with an example embodiment of the present invention.

FIG. 1 schematically shows a representation of a device 100 for intrusion detection in a computer network. Device 100 is designed as a system on a chip system.

Device 100 includes a hardware switch unit 102, a hardware filter 104 and a computing device 106. Computing device 106 may be a microprocessor or a microcontroller. Computing device 106 is designed for the intrusion detection.

The computer network in the example is an automotive Ethernet network. The automotive Ethernet described by way of example is based on Ethernet Standard IEEE 802.3-2018 and may include elements from IEEE 802.1Q, 100BASE-T1 or 1000BASE-T1. Hardware switch unit 102 in the example includes an Ethernet switch.

Hardware filter 104 in the example includes a Ternary Content Addressable Memory 108, an Address Translation Unit 110, a Virtual Local Area Network Translation Unit 112 and additional hardware filters 114, for example, a Dynamic Host Configuration Protocol filter, a User Datagram Protocol filter and/or a Precision Time Protocol filter.

The hardware filters are designed to analyze a data packet for the intrusion detection. The hardware filters are optionally designed to provide the data packet or a copy of the data packet to computing device 106 for the intrusion detection as a function of the result of the check. For this purpose, hardware filter 104 and computing device 106 are connected to a data line 116. Computing device 106 in the example is part of a microcontroller, which includes a random access memory 118. Data packets are transmittable via data line 116 from hardware filter 104 into random access memory 118 for the intrusion detection.

Device 100 includes at least one input and at least one output. These are implemented as ports 120 for hardware switch unit 102.

Hardware switch unit 102 includes a memory 122 for a counter. Memory 122 in the example includes a register 122i. The counter is a hardware counter, for example. Memory 122 is a random access memory, for example. Memory 122 may also be a non-volatile read and write memory. Hardware switch unit 102 includes a signal line 124, which is designed to transmit a signal for determining a value of the counter of at least one of the hardware filters to memory 122. In the example, all hardware filters are connected via signal line 124 to memory 122.

Hardware switch unit 102 includes an additional memory 126 for hardware addresses of devices of the computer network, which are coupled to device 100. Memory 126 is a random access memory, for example. Memory 126 may also be a non-volatile read and write memory.

Hardware switch unit 102 is designed to receive a data packet at an input. Hardware switch unit 102 is designed to select an output of device 100 for sending the data packet or a copy of the data packet as a function of data link layer information from the data packet and as a function of a hardware address from memory 122.

Computing device 106 is designed to carry out an analysis for detecting an intrusion pattern in a network traffic in the computer network as a function of information from the data packet. Computing device 106 is designed to determine a result of the intrusion detection as a function of the value of the counter in hardware switch unit 102 and independently of information from the data packet, in particular, without an evaluation of information from the data packet by computing device 106.

Hardware filter 104 is designed to compare in a comparison an actual value from a field of data packets with a setpoint value for values from this field. The field includes data link layer data or network layer data. Hardware filter 104 is designed to determine a value for the counter as a function of a result of the comparison. In the example, the counter is incremented when a deviation between the actual value and the setpoint value is present, or exceeds a threshold value.

Shapes of hardware filter 104 are described in the following.

Hardware filter 104 includes, for example, a Ternary Content Addressable Memory 108, in which a mask for the setpoint value is stored. Hardware filter 104 in this case is designed to compare the actual value with the mask stored in the Ternary Content Addressable Memory, and to establish as a function of the result of the comparison whether or not the deviation is present.

The setpoint value, for example, characterizes a hardware address from the memory. The hardware address is, in particular, a Medium Access Control address of the data link layer. Hardware filter 104 in this example includes Address Translation Unit 110, which is designed to determine the actual value as a function of data from a hardware address field of a data packet at an input or output of device 100, to compare the actual value in a comparison with the setpoint value, and to establish as a function of the result of the comparison whether or not the deviation is present.

Address Translation Unit 110 is a unit in the data link layer, which selects the output in hardware switch unit 102 at which a received data packet or its copy is sent during operation.

The setpoint value, for example, characterizes a Virtual Local Area Network. The setpoint value is stored in memory 122, for example. Hardware filter 104 includes a Virtual Local Area Network Translation Unit 112, which is designed to determine the actual value as a function of data, which characterize the association of a data packet at an input or output of device 100 with a Virtual Local Area Network, to compare the actual value in a comparison with the setpoint value, and to establish as a function of the result of the comparison whether or not the deviation is present.

Virtual Local Area Network Translation Unit 112 is a unit in the data link layer, which selects the output in hardware switch unit 102 at which a received data packet or its copy is sent during operation in a Virtual Local Area Network.

Hardware filter 104 may be designed to detect the presence of a deviation, either when hardware filter 104 at an input or output of the device for a tagged Virtual Logical Area Network establishes an untagged Virtual Logical Area Network data packet, or when additional hardware filter 114 at an input or output of the device for an untagged Virtual Logical Area Network establishes a tagged Virtual Logical Area Network data packet.

Hardware filter 104 may be designed to detect the presence of a deviation if additional hardware filter 114 at an input or output of device 100 establishes a data packet having an unknown Ethertype, a false checksum or a false packet structure.

Hardware filter 104 may include a Dynamic Host Configuration Protocol filter as an additional hardware filter 114, which is designed to establish at the input or output of the device Dynamic Host Configuration Protocol packets for Internet Protocol Version 4 and/or for Internet Protocol Version 6 including Dynamic Host Configuration Protocol Port 67 and/or Port 68.

Hardware filter 104 may include a User Datagram Protocol filter as additional hardware filter 114, which is designed to establish at the input or output of the device User Datagram Protocol Broadcast messages for Internet Protocol Version 4 and/or for Internet Protocol Version 6.

Hardware filter 104 may include a Precision Time Protocol filter as additional hardware filter 114, which is designed to establish Precision Time Protocol messages at the input or output of the device, and to store their content, in particular, time stamp sequence number, correction field at least temporarily in a register for context information.

The described shapes of hardware filter 104 may be situated in parallel or in succession in hardware switch unit 102. Not all shapes of hardware filter 104 need be provided.

Hardware filter 104 is designed in one aspect to provide the data packet, the actual value of which has been compared, to computing device 106 for analysis if the counter exceeds a predetermined value. Hardware filter 104 is designed in one aspect not to provide the data packet to computing device 106 for analysis, the actual value of which has been compared, if the counter does not exceed the predefined value.

Hardware filter 104 is designed in one aspect to increment the counter if a deviation is present. In another aspect, hardware filter 104 is designed to compare the deviation with a threshold value and to increment the counter if the deviation exceeds the threshold value.

One separate counter each may be provided for individual, in particular, for each form of hardware filter 104, in particular, for Ternary Content Addressable Memory 108, Address Translation Unit 110, Virtual Local Area Network Translation Unit 112, additional hardware filter 114.

Figure 2:
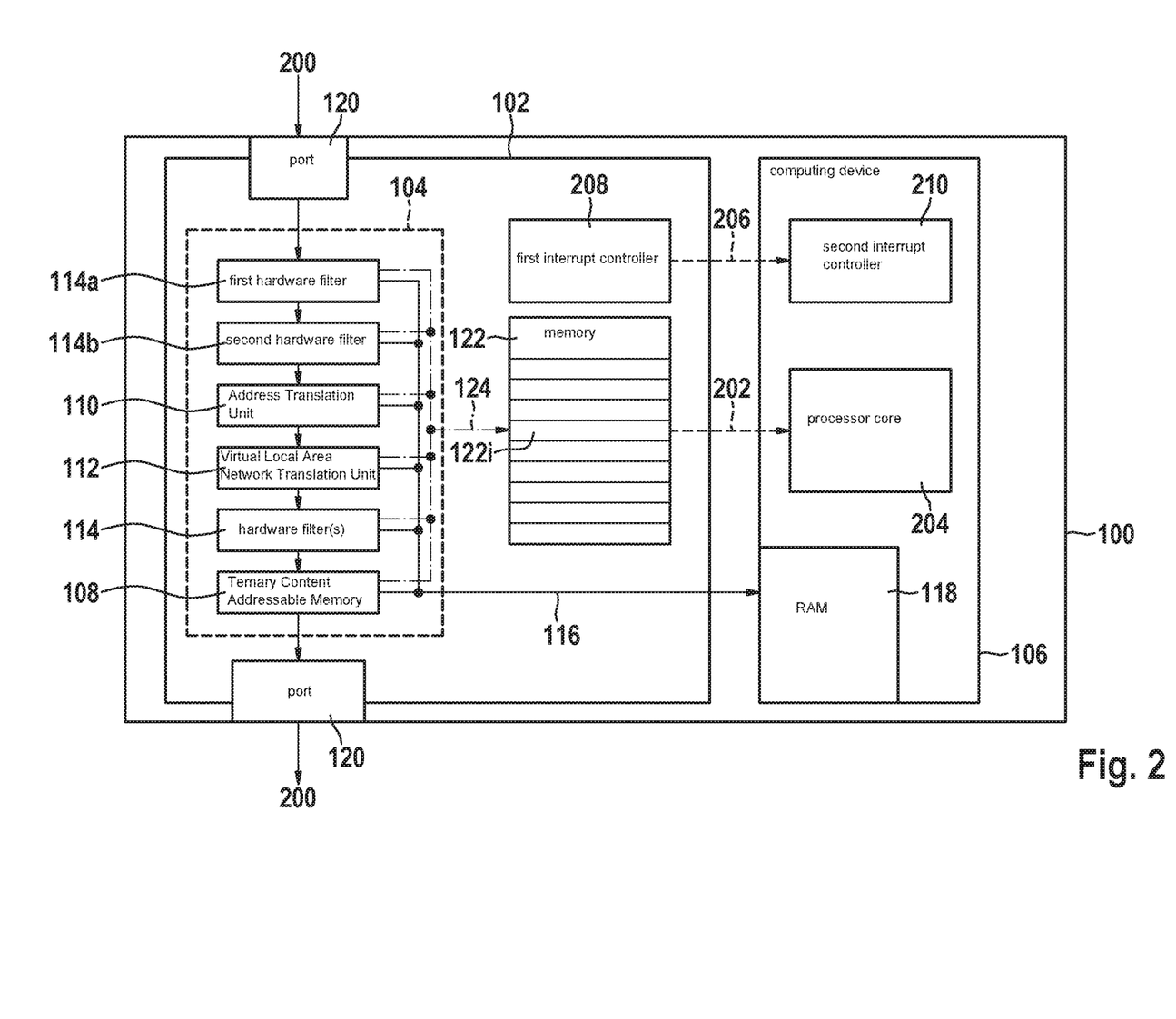
FIG. 2 shows a data flow in the device in accordance with an example embodiment of the present invention.

FIG. 2 depicts an exemplary data flow in device 100 for an Ethernet data packet 200. Ethernet data packet 200 is received at an input of device 100, i.e., in the example, at one of ports 120. Ethernet data packet 200 is sent at an output of device 100, i.e., in the example, at one of ports 120.

Between the input and the output, Ethernet data packet 200 runs through a first hardware filter 114a, which is designed to check the packet structure. First hardware filter 114a is designed to increment the value of the counter if the packet structure does not correspond to a setpoint structure for Ethernet data packet 200 and otherwise not to increment the counter. First hardware filter 114a may be designed to transmit Ethernet data packet 200 via data line 116 for computing device 106 into random access memory 118 if the counter exceeds the predefined value and otherwise not to transmit Ethernet data packet 200.

Between first hardware filter 114a and the output, Ethernet data packet 200 runs through a second hardware filter 114b, which is designed to check a checksum for Ethernet data packet 200. Second hardware filter 114b is designed to increment the value of the counter, if the checksum does not correspond to a setpoint checksum for Ethernet data packet 200 and otherwise not to increment the counter. Second hardware filter 114b may be designed to transmit Ethernet data packet 200 via data line 116 for computing device 106 into random access memory 118 if the counter exceeds the predefined value and otherwise not to transmit Ethernet data packet 200.

Between second hardware filter 114b and the output, Ethernet data packet 200 runs through Address Translation Unit 110. Address Translation Unit 110 is designed to increment the counter if the deviation is detected and otherwise not to increment the value of the counter. Address Translation Unit 110 may be designed to transmit Ethernet data packet 200 via data line 116 for computing device 106 into random access memory 118, if the counter exceeds the predefined value and otherwise not to transmit Ethernet data packet 200. Address Translation Unit 110 in the example, also establishes port 120 for the output.

Between Address Translation Unit 110 and the output, Ethernet data packet 200 runs through Virtual Local Network Translation Unit 112. Virtual Local Network Translation Unit 112 is designed to increment the value of the counter if the deviation is detected and otherwise not to increment the value of the counter. Virtual Local Area Network Translation Unit 112 may be designed to transmit Ethernet data packet 200 via data line 116 for computing device 106 into random access memory 118 if the counter exceeds the predefined value and otherwise not to transmit Ethernet data packet 200. Virtual Local Area Network Translation Unit 112 in the example also establishes whether or not Ethernet data packet 200 may be sent via port 120, which is established as an output, according to the rules for the Virtual Local Area Network.

The sending does not occur, for example, if port 120 for this Virtual Local Area Network is not allowed to be used.

Between Virtual Local Area Network Translation Unit 112 and the output, Ethernet data packet 200 in the example runs through additional hardware filter 114. The counter is incremented when the deviation is detected. The counter is not incremented when no deviation is detected. Ethernet data packet 200 in one aspect may be transmitted via data line 116 for computing device 106 into random access memory 118, if the counter exceeds the predefined value. Ethernet data packet 200 in this aspect is otherwise not transmitted.

An optional first interface 202 between memory 122 and computing device 106, more precisely, processor core 204 of computing device 106, is also depicted in FIG. 2.

An optional second interface 206 between an optional first interrupt controller 208 of hardware switch unit 102 and an optional second interrupt controller 210 in computing device 106 are also depicted in FIG. 2.

First interrupt controller 208 is designed to send an interrupt via second interface 206 to second interrupt controller 210, if a deviation has been established in hardware filter 104.

Second interrupt controller 210 is designed to activate processor core 204 to read the instantaneous counter value from the counter if the former is required for the intrusion detection. Second Interrupt Control 210 may be designed to read context information from the register in memory 122 when the interrupt is received by second interrupt controller 210.

In this case, computing device 106 may be designed to carry out the analysis for the detection by the microprocessor of an intrusion pattern in a network traffic in the computer network as a function of the context information.

Figure 3:
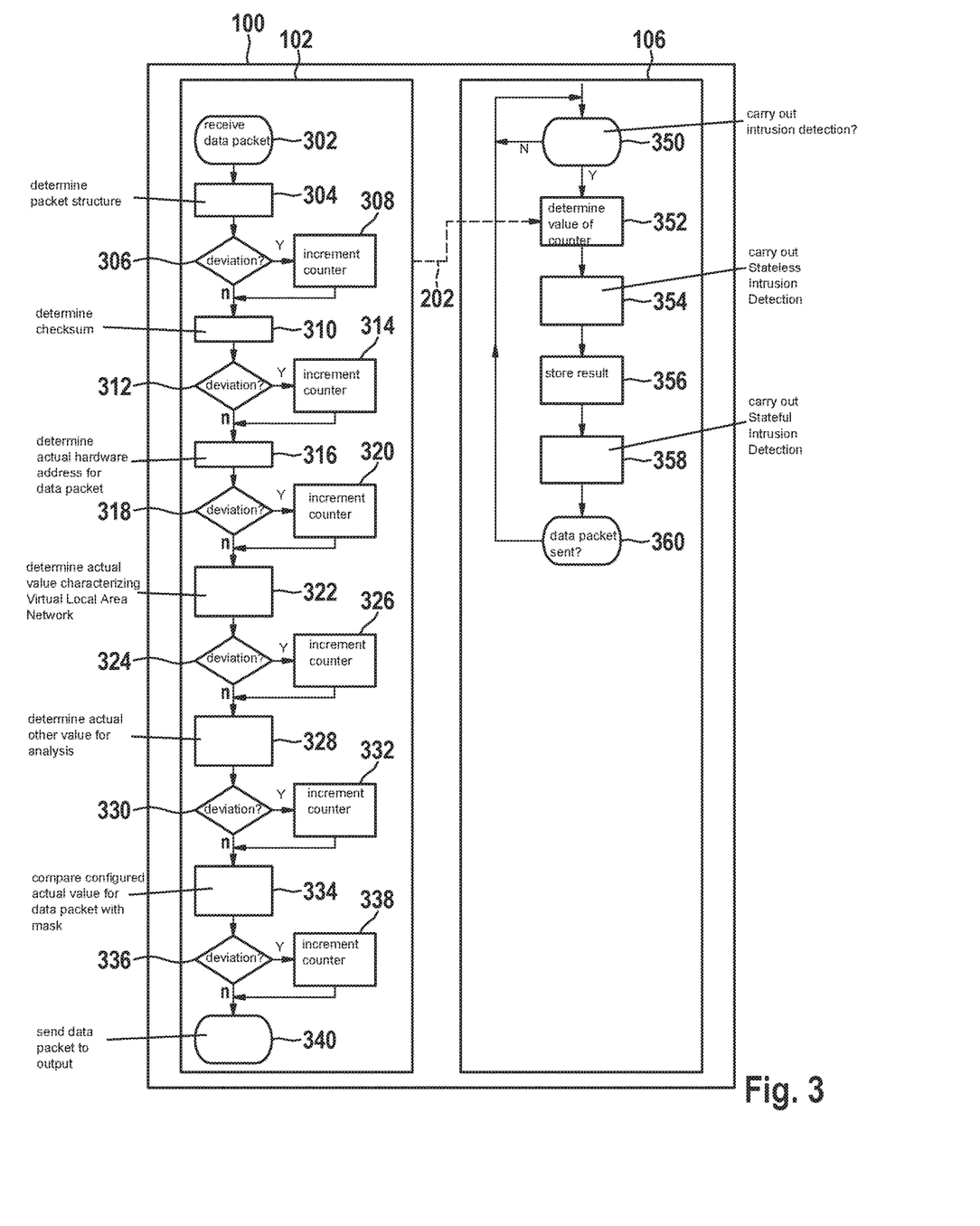
FIG. 3 shows steps in a method for the intrusion detection in accordance with an example embodiment of the present invention.

FIG. 3 describes an exemplary sequence of a method for the intrusion detection.

In a step 302, Ethernet data packet 200 is received at a port 120. A step 304 is subsequently carried out.

In a step 304, the packet structure of Ethernet data packet 200 is determined. A step 306 is subsequently carried out.

In step 306, it is checked whether a deviation of the packet structure from the setpoint structure is present. It is checked, for example, whether an irregularity with respect to the packet structure is present.

If a deviation from the setpoint structure is present, a step 308 is carried out. If no deviation is present, a step 310 is carried out.

In step 308, the counter is incremented. Ethernet data packet 200 is optionally sent to computing device 106 if the counter exceeds the predefined value. Step 310 is subsequently carried out.

In step 310, a checksum for Ethernet data packet 200 is determined. A step 312 is subsequently carried out.

In step 312, it is checked whether a deviation of the checksum from a setpoint checksum is present. For example, it is checked whether an irregularity with respect to the checksum is present.

If a deviation from the setpoint checksum is present, a step 314 is carried out. If no deviation is present, a step 316 is carried out.

In step 314, the counter is incremented. Ethernet data packet 200 is optionally sent to computing device 106 if the counter exceeds the predefined value. Step 316 is subsequently carried out.

In step 316, an actual hardware address for Ethernet data packet 200 is determined. A step 318 is subsequently carried out.

In step 318, it is checked whether the actual hardware address is known, in particular, matches a hardware address from memory 122. For example, it is checked whether a known Media Access Control address is present.

If a deviation from, in particular, any hardware address known from the memory is present, a step 320 is carried out. If no such deviation is present, in particular, if the actual hardware address is known, a step 322 is carried out.

In step 320, the counter is incremented. Ethernet data packet 200 is optionally sent to computing device 106 if the counter exceeds the predefined value. Step 322 is subsequently carried out.

In step 322, an actual value characterizing a Virtual Local Area Network is determined. A step 324 is subsequently carried out.

In step 324, it is checked whether the actual value corresponds to a setpoint value characterizing a Virtual Local Area Network, into which Ethernet data packet 200 may be sent at port 120 determined with the aid of the actual hardware address. A match to a setpoint value from memory 122, in particular, is checked.

If a deviation between actual value and setpoint value is present, a step 326 is carried out. If no such deviation is present, a step 328 is carried out.

In step 326, the counter is incremented. Ethernet data packet 200 is optionally sent to computing device 106 if the counter exceeds the predefined value. Step 328 is subsequently carried out.

In step 328 an additional actual value for an analysis with one of the described other hardware filters is optionally determined.

At the input or output, for example, for a tagged Virtual Logical Area Network, an untagged Virtual Logical Area Network Ethernet data packet 200 is established, or for an untagged Virtual Logical Area Network, a tagged Virtual Logical Area Network Ethernet data packet 200 is established.

At the input or output, for example, a Dynamic Host Configuration Protocol packet for Internet Protocol Version 4 and/or for Internet Protocol Version 6 including Dynamic Host Configuration Protocol port 67 and/or port 68 is established. For example, a User Datagram Protocol Broadcast message for Internet Protocol Version 4 and/or for Internet Protocol Version 6 is established at the input or output. For example, a Precision Time Protocol message is established at the input or output, the content of which, in particular, time stamp, sequence number, correction field, being stored at least temporarily in a register for context information.

A step 330 is subsequently carried out.

In step 330, it is checked whether a deviation of the additional actual value from an additional setpoint value for the additional actual value is present. If a deviation is present, a step 332 is carried out. Otherwise, a step 334 is carried out.

In step 332, the counter is incremented. Ethernet data packet 200 is optionally sent to computing device 106 if the counter exceeds the predefined value. Step 334 is subsequently carried out.

In step 334, a configured actual value for Ethernet data packet 200 is compared with a mask configured therefor stored in the Ternary Content Addressable Memory. A step 336 is subsequently carried out.

In step 336, it is established as a function of the result of the comparison whether or not a deviation from the mask is present. If a deviation is present, a step 338 is carried out. If no deviation is present, a step 340 is carried out.

In step 338, the counter is incremented. Ethernet data packet 200 is optionally sent to computing device 106 if the counter exceeds the predefined value. Step 340 is subsequently carried out.

In step 340, Ethernet data packet 200 is sent at the output.

In computing device 106, a method additionally runs in parallel in which, after its start, it is checked in a step 350 whether the intrusion detection is to be carried out. In the example, the intrusion detection is carried out separately from the receipt of Ethernet data packet 200 or separately from the receipt of another data packet by computing device 106. The implementation is cyclical, for example. The implementation may be started after the receipt of Ethernet data packet 200 or of another data packet, or after the occurrence of an event, for example, of an interrupt.

If the intrusion detection is to be carried out, a step 352 is carried out. Otherwise, step 350 is carried out.

In step 352, the value of a counter from memory 122 is determined. A step 354 is subsequently carried out.

In step 354, a Stateless Intrusion Detection is carried out as a function of the value of the counter. If the counter exceeds the predefined value, the Stateless Intrusion Detection, for example, is carried out as a function of information from Ethernet data packet 200. A step 356 is subsequently carried out.

In step 356, an analysis result of the Stateless Intrusion Detection is stored, for example, as context information in memory 122. A step 358 is subsequently carried out.

In step 358, a Stateful Intrusion Detection is carried out as a function of information about stored analysis results, for example, from memory 122. A step 360 is subsequently carried out.

In step 360, it is checked whether Ethernet data packet 200 has been sent. If Ethernet data packet has been sent, the method is ended. Otherwise, step 350 is carried out.

It may be provided, in addition, to analyze also the content of Ethernet data packet 200 in the intrusion detection, in particular, if a need therefor is detected based on the value for the counter, in particular, because the value reaches, exceeds, or falls below a threshold value.

What is claimed is:

1. A method for detection of an intrusion by a data packet into an automotive computer network, the method comprising the following steps:
   receiving the data packet at an input of a hardware switch unit, the hardware switch unit including a hardware filter;
   analyzing the data packet by the hardware switch for the detection of the intrusion by the data packet into the automotive computer network, the automotive computer network being internal to the vehicle, the analyzing including:
   comparing, by the hardware filter, an actual value from a field of the data packet with a setpoint value for values from the field, the field including data link layer data or network layer data, and
   determining, by the hardware switch unit, a value for a counter as a function of a result of the comparison, wherein the determining of the value includes incrementing a counter value of the counter based on a deviation between the actual value and the setpoint value being present; and
   determining, by a computing device, a result of the detection of the intrusion by the data packet into the automotive computer network, the computing device determining the result of the detection as a function of the value of the counter in the hardware switch unit and independently of information from the data packet, without an evaluation of information from the data packet by the computing device.

2. The method as recited in claim 1, wherein the value of the counter is incremented when a deviation between the actual value and the setpoint value is present.

3. The method as recited in claim 1, wherein the counter is a hardware counter in a register of the hardware switch unit.

4. The method as recited in claim 1, wherein the hardware filter includes a Ternary Content Addressable Memory in which a mask for the setpoint value is stored, the actual value being compared in the comparison with the mask stored in the Ternary Content Addressable Memory.

5. The method as recited in claim 1, wherein the setpoint value characterizes a hardware address from a memory of the hardware switch unit, the actual value being determined at the input or the output as a function of data from a hardware address field of the data packet.

6. The method as recited in claim 1, wherein the setpoint value characterizes a Medium Access Control address from a memory of the hardware switch unit, the actual value being determined at the input or the output as a function of data from a Medium Access Control address field of the data packet.

7. The method as recited in claim 1, wherein the setpoint value characterizes a Virtual Local Area Network, the setpoint value being determined from a memory of the hardware switch unit, the actual value being determined as a function of data, which characterize an association of the data packet at the input or the output, with a Virtual Local Area Network.

8. The method as recited in claim 1, wherein presence of a deviation is detected in the result, either when the hardware filter at the input or the output for a tagged Virtual Logical Area Network establishes an untagged Virtual Logical Area Network data packet, or when the hardware filter at the input or the output for an untagged Virtual Logical Area Network establishes a tagged Virtual Logical Area Network Data Packet.

9. The method as recited in claim 1, wherein presence of a deviation is detected in the result when the hardware filter establishes the data packet at the input or the output has an unknown Ethertype, or a false checksum, or a false packet length, or a false packet structure.

10. The method as recited in claim 1, wherein presence of a deviation is detected in the result, when:
(i) a Dynamic Host Configuration Protocol filter at the input or the output establishes a Dynamic Host Configuration Protocol packet for Internet Protocol Version 4 and/or for Internet Protocol Version 6 including Dynamic Host Configuration Protocol port 67 and/or port 68; or
(ii) a User Datagram Protocol filter at the input or the output establishes a User Datagram Protocol Broadcast message for Internet Protocol Version 4 and/or for Internet Protocol Version 6; or
(iii) a Precision Time Protocol filter at the input or the output establishes a Precision Time Protocol message, the content of which, including time stamp, sequence number, correction field, is stored at least temporarily in a register for context information.

11. The method as recited in claim 1, further comprising: analyzing a content of the data packet when a need is detected based on the value for the counter.

12. A device for detection of an intrusion by a data packet into an automotive computer network, comprising:
a system on a chip system, which includes a hardware switch unit including a hardware filter, and a computing device for the detection of the intrusion of the data packet into the automotive computer network, wherein the system on a system chip system is configured to:
receive the data packet at an input of the hardware switch unit;
analyze the data packet by the hardware switch for the detection of the intrusion by the data packet into the automotive computer network, the automotive computer network being internal to a vehicle, the system being configured to, for the analyzing:
compare, by the hardware filter, an actual value from a field of the data packet with a setpoint value for values from the field, the field including data link layer data or network layer data, and
determine, by the hardware switch unit, a value for a counter as a function of a result of the comparison, wherein the determination of the value for the counter includes incrementing a counter value of the counter based on a deviation between the actual value and the setpoint value being present; and
determine, by the computing device, a result of the intrusion detection of the intrusion by the data packet into the automotive computer network, the computing device being configured to determine the result of the detection as a function of the value of the counter in the hardware switch unit and independently of information from the data packet, without an evaluation of information from the data packet.

13. The device as recited in claim 12, wherein the computing device is microprocessor or microcontroller.

14. The device as recited in claim 12, wherein the device includes a counting unit, which is configured to increment the value of the counter when a deviation between the actual value and the setpoint value is present or exceeds a threshold value.

15. The device as recited in claim 12, wherein the counter is a hardware counter in a register of the device.

16. The device as recited in claim 12, wherein a Ternary Content Addressable Memory, and/or an Address Translation Unit, and/or a Virtual Local Area Network Translation Unit, and/or a Dynamic Host Configuration Protocol filter, and/or a User Datagram Protocol filter and/or a Precision Time Protocol filter, is provided as the hardware filter to analyze the data packet for the detection of the intrusion by the packet into the automotive computer network and to determine the result for the determination of the value of the counter.

17. A non-transitory computer-readable memory medium on which is stored a computer program for detection of an intrusion by a data packet into an automotive computer network, the computer program, when executed by a computer, causing the computer to perform or control the following steps:
receiving the data packet at an input of a hardware switch unit, the hardware switch unit including a hardware filter;
analyzing the data packet for the detection of the intrusion by the data packet into the automotive computer network, the automotive computer network being internal to the vehicle, the analyzing including:
comparing, by the hardware filter, an actual value from a field of the data packet with a setpoint value for values from the field, the field including data link layer data or network layer data, and
determining, by the hardware switch unit, a value for a counter as a function of a result of the comparison, wherein the determining of the value includes incrementing a counter value of the counter based on a deviation between the actual value and the setpoint value being present; and determining, by a computing device, a result of the detection of the intrusion by the data packet into the automotive computer network, the computing device determining the result of the detection as a function of the value of the counter in the hardware switch unit and independently of information from the data packet, without an evaluation of information from the data packet by the computing device.

\* \* \* \* \*